(12) United States Patent
Berstis (10) Patent No.: US 7,129,981 B2
(45) Date of Patent: Oct. 31, 2006

(54) RENDERING SYSTEM AND METHOD FOR IMAGES HAVING DIFFERING FOVEAL AREA AND PERIPHERAL VIEW AREA RESOLUTIONS

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/185,710

(22) Filed: Jun. 27, 2002

(65) Prior Publication Data

US 2004/0003409 A1    Jan. 1, 2004

(51) Int. Cl.
*H04N 5/222*      (2006.01)
*G09G 5/00*       (2006.01)
*H04N 5/232*      (2006.01)

(52) U.S. Cl. .............................. 348/333.12; 348/14.12; 348/333.03; 348/369; 348/47; 345/634

(58) Field of Classification Search ............ 348/14.12, 348/14.16, 211.99, 211.1, 46, 47, 369, 211.3, 348/360, 333.03, 49, 333.09, 333.11, 333.12, 348/239

See application file for complete search history.

(56) References Cited

U.S. PATENT DOCUMENTS

| | | | | |
|---|---|---|---|---|
| 4,199,785 A | * | 4/1980 | McCullough et al. | 348/704 |
| 5,005,083 A | * | 4/1991 | Grage et al. | 348/588 |
| 5,103,306 A | * | 4/1992 | Weiman et al. | 348/400.1 |
| 5,557,358 A | * | 9/1996 | Mukai et al. | 396/296 |
| 5,754,230 A | * | 5/1998 | Tsuruta | 348/333.12 |
| 5,886,816 A | | 3/1999 | Faris et al. | 359/464 |
| 5,917,539 A | | 6/1999 | Sorensen et al. | 348/56 |
| 6,078,349 A | * | 6/2000 | Molloy | 348/14.07 |
| 6,271,808 B1 | | 8/2001 | Corbin | 345/7 |
| 6,292,713 B1 | * | 9/2001 | Jouppi et al. | 700/245 |
| 6,639,626 B1 | * | 10/2003 | Kubo et al. | 348/218.1 |
| 6,670,985 B1 | * | 12/2003 | Karube et al. | 348/207.1 |
| 6,677,979 B1 | * | 1/2004 | Westfield | 348/14.12 |
| 6,714,665 B1 | * | 3/2004 | Hanna et al. | 382/117 |
| 6,727,954 B1 | * | 4/2004 | Kondo et al. | 348/374 |
| 6,847,392 B1 | * | 1/2005 | House | 348/36 |
| 6,853,809 B1 | * | 2/2005 | Pelletier | 396/85 |
| 6,890,077 B1 | * | 5/2005 | Dunn | 351/224 |
| 6,919,907 B1 | * | 7/2005 | Berstis | 345/619 |
| 2003/0218672 A1 | * | 11/2003 | Zhang et al. | 348/14.16 |

OTHER PUBLICATIONS

"Eye Movement Tracking Technology", 6 pages, downloaded from http://www.standford.edu/~rsoni/ on Mar. 11, 2002.
"Models of Tracking and Search Eye-Movement Behavior", Lee Stone, et al., 3 pages, downloaded on Mar. 11, 2002, from http://www.vision.arc.nasa.gov/personnel/lee/publications/ModelProject.pdf.
"Eyelink II", 12 pages, SR Research Ltd., downloaded on Mar. 11, 2002 from http://www.eyelinkinfo.com/body.htm.
"3 Psychological and Physiological Aspects of Eye-Gaze Tracking", sections 3.1 through 3.5, Arne John Glenstrup, et al., 18 pages, downloaded on Mar. 11, 2002 from http://www.diku.dk/~panic/eyegaze/node13.ntml.

* cited by examiner

*Primary Examiner*—Ngoc-Yen Vu
*Assistant Examiner*—Carramah J. Quiett
(74) *Attorney, Agent, or Firm*—Robert H. Frantz; David A. Mims, Jr.

(57) ABSTRACT

A client-server arrangement for camera viewing using digital cameras across a computer network. A camera server controls a motorized gimbal which determines the viewing angles of a set of cameras according to signals from a client computer which is equipped with an eye movement tracking system. Movements of the viewer's eyes result in changes in viewing angle of the remote cameras. A high resolution foveal field of view image centered on the user's point of interest is captured and overlaid on a lower resolution full filed of view image, rendering a combined image having a low resolution peripheral area and a high resolution foveal area, and being significantly reduced in size compared to a full resolution, full field of view image. This combined image is transmitted to the client for display to the user.

13 Claims, 5 Drawing Sheets

RENDERING SYSTEM AND METHOD FOR IMAGES HAVING DIFFERING FOVEAL AREA AND PERIPHERAL VIEW AREA RESOLUTIONS

CROSS-REFERENCE TO RELATED APPLICATIONS (CLAIMING BENEFIT UNDER 35 U.S.C. 120)

This patent application is related to U.S. patent application Ser. No. 10/127,068, filed on Apr. 4, 2002, by Viktors Berstis.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 10/127,068, filed on Apr. 4, 2002, by Viktors Berstis, is hereby incorporated by reference in its entirety, including figures.

BACKGROUND OF THE INVENTION

1. Field of the Invention

This invention relates to the arts of remote viewing systems and remote image processing, for purposes such as remote quality inspection, maintenance service actions, medical procedures, and the like.

2. Background of the Invention

Remote viewing of camera images is well known in the art, from the proprietary arrangements used in systems such as building surveillance, to the more modem "web cams" which are viewable over publicly-accessible computer networks, such as the Internet.

In any remote viewing arrangement, several fundamental components exist, including one or more cameras or imaging devices, a transmission network, and a viewing console. In older arrangements, such as a remote security monitoring configuration, an "analog" camera may be employed which transmits analog video signals (e.g. NTSC or RGB) over a transmission network to a monitoring display (e.g. television or CRT video monitor). In the more advanced versions of these older systems, the camera may be mounted to a motorized gimbal, which allows the camera to be pointed in a variety of positions within 2 or 3 axes. In some systems, the operator at the monitoring display may be able to command the gimbal to point the camera in a desired direction, and in other systems, the gimbal may simply cycle from one axis extreme to another (e.g. auto-panning from left to right).

To provide similar functionality, "web cams" have be developed with the same types of features, although their means of accomplishing these features can be quite different from the older "analog" versions. Web cams have been provided with fixed positions for many applications, including remote security monitoring and public relations promotions (e.g. web cams showing live pictures of ski slopes or beaches). These arrangements including a digital camera with a web server, interconnected to a client computer via a computer network such as a wide area network ("WAN"), local area network ("LAN"), wireless digital network, or the Internet. The client computer may be equipped with proprietary software for receiving and displaying images, or as in many cases, may be equipped with "standard" software such as a web browser. The camera "web server" provides digital images in a format compatible with corresponding client computer, such as Joint Photographic Experts Group ("JPEG") or Graphic Interchange Format ("GIF") web photos. In more advanced web cam arrangements which provide for moving video transmission to the client computer, proprietary digital video formats may be employed, or standard video data formats (e.g. streaming video) such as the well-known Motion Picture Experts Group ("MPEG") format. The digital images are sent from the server computer to the client computer using proprietary digital transmission protocols, or standard digital transmission protocols such as Transmission Control Protocol/Internet Protocol ("TCP/IP").

For some advanced uses of web cams, web cams have also been attached to motorized gimbals with remote control from the corresponding client computer. This allows the user the same advantages of the older "analog" systems, in which the client computer establishes a "back channel" or "control channel" through the computer network to the server computer through which gimbal commands may be passed. In such a system, a user may use a gaming joystick on his or her personal computer ("PC"), mouse commands, or on-screen pan controls to send gimbal pointing commands to the remote web cam server computer. When these commands are received by the web cam server computer, the server computer then implements them as control signals to the motors of the gimbal to effect a change in pointing angle of the web cam. Such remotely-controlled web cams are found in more advanced security applications, as well as in some applications such as remote quality inspection, "telemedicine", and the like.

In most basic applications, the web cams provided are of fairly low-resolution performance, and often transmit only black and white images, in order to minimize the digital transmission bandwidth consumed by the images while in transit from the remote server to the client computer. This allows the images to be provided to the user as quickly as possible with minimized noticeable delays.

For more advanced applications such as telemedicine, the web cams have very high resolution, however. In these cases, the delay of receiving a new image from a recently repositioned web camera may be quite noticeable, which reduces the number of possible applications for such a system to only include non-realtime applications.

Further compounding this problem and trade-off between resolution and image update latency is the fact that for many of these advanced applications, stereoscopic remote monitoring may be required. For example, in order to enable remote surgical procedures, a system with two remote web cams may be employed to provide the surgeon with needed depth perception. In these stereoscopic applications, the bandwidth demand is doubled due to the doubling of the number of cameras. Additionally, use of manual controls such as joysticks and on-screen icons may not be sufficient for the intended application.

As such, there is a need in the art for a remote stereoscopic viewing system which reduces server-to-client image latency and which provides sufficient clarity and resolution for more advanced applications such as telemedicine. Ideally, this new system and method would be compatible with commonplace technologies, such as the Internet, web browsers, and web servers, in order to maximize the usefulness of the invention. This new system and method should use minimal transmission bandwidth, as well, in order to enable a wider variety of client devices interconnected via lower-bandwidth transmission networks.

Further, there is a need in the art for a system which decreases the latency of repositioning a web cam which is remotely movable via gimbal controls in order to facility more responsive remote viewing for higher precision tasks, such as remote security monitoring, remote surgery, and remote maintenance.

SUMMARY OF THE INVENTION

The present invention provides an enhancement to the invention disclosed in the related patent application. According to the related patent application, a cooperative client-server arrangement for remote mono- or stereoscopic viewing using digital cameras across a computer network such as the Internet is disclosed. A remote camera server controls a motorized gimbal to cause the viewing angle of a camera according to signals from a client computer, wherein the client computer is equipped with an eye movement tracking system. As such, movements of the client computer user's eyes result in changes in viewing angle of the remote cameras.

To reduce the image transmission bandwidth and time requirements and to shorten the latency from the user's eye moving to presenting an updated image to the user, a special image processing method is employed by the server which includes dividing the full-resolution image into a foveal area and a peripheral area. The peripheral area data is then compressed or reduced in resolution, thereby reducing the image data size. This image is then transmitted to the client and displayed to the user. Later, the full resolution data from the peripheral area of the image is transmitted to the client machine so that the full image may be rendered in original full resolution.

The present invention provides a method for rendering an image in two parts——foveal and peripheral—using two separate cameras, one for capturing the higher-resolution foveal area and another for capturing the lower resolution peripheral area. This avoids the need for first capturing a high-resolution image of the entire field of view, separating it into peripheral and foveal, and then compressing the peripheral view data. Instead, two cameras are pointed at the same point of interest. A first camera with higher resolution imaging sensors or having a telephoto lens is used to capture a high resolution image of the center, foveal area of the field of view. The second camera, which has a lower resolution imaging sensor or wide angle lens, is used to simultaneously capture the entire field of view. The data from the first camera representing the foveal view is then transmitted with priority to the remote viewer.

At the remote viewer, the image data from the first camera (e.g. the foveal high-resolution image) is then "overlaid" (e.g. substituted into) the image data from the second camera, rendering an image with higher resolution in the foveal field of view, and lower resolution in the peripheral area.

In an alternate embodiment, a single camera having an adjustable lens is set to capture a foveal image using a telephoto lens setting, and set to capture a peripheral image using a wide angle lens setting, all within a short period of time such that the two images approximate a single frame of image in time for human viewing (e.g. within 1/30th of a second).

BRIEF DESCRIPTION OF THE DRAWINGS

The following detailed description when taken in conjunction with the figures presented herein provide a complete disclosure of the invention.

DETAILED DESCRIPTION OF THE INVENTION

With the well-known present day interactive Internet technology, it is possible to have remote web cams and other such viewing devices. The visual resolution of these systems is typically quite limited, mostly due to bandwidth limitations through the internet. The present invention is preferrably realized in conjunction with or as an enhancement to the invention of the related (and incorporated) patent application.

In a first advantage of the related invention as described in the related patent application, it is possible to have higher resolution images and stereoscopic remote viewing, as well. In a second advantage of the related invention, it is possible to control the remote viewing angle using eye movements rather than a joystick, on-screen icons, or other type of pointing device.

The present invention enhances the related invention by using two cameras of differing lens configurations (e.g. telephoto and wide angle), differing image capture resolutions, or a single camera with an adjustable lens configuration to capture separate foveal and peripheral images.

Therefore, it is useful to review the invention of the related application, with special notes and disclosure to particularly point out the enhancements and interactions to the related invention which comprise the present invention.

The related invention solves the resolution problem, provides stereoscopic viewing, and reduces the demand for extremely high bandwidth, through three aspects of its preferred embodiment. First, the remote camera portion of the system has two swiveable cameras on a motorized gimbal, spaced apart with a distance similar to the distance between two human eyes (about 64 mm). The swiveling action is controlled by the second aspect of the preferred embodiment, according to which commands are sent to the remote camera portions to be used to swivel the cameras to point to where the remote observer's eyes are looking.

While eye movement tracking is an art which is in development, many practical systems are already available using a variety of eye position measurement techniques including shining an infrared light onto the cornea, and computing the direction based on the displacement of the glint from the center of the iris.

The third aspect of the preferred embodiment of the related invention provides that the remote camera server is adapted to send high resolution image data from the center portion of the viewing area with higher priority than the peripheral video data. This higher resolution data is projected on the remote client viewing screen so that the viewer's eyes are centered on the highest resolution portion of the image.

Other well-known approaches to reduce the transmission bandwidth of high resolutions have included compressing the entire image, transmitting it, and decompressing it at the recipient computer prior to display. These techniques increase the computational intensity of the client software (e.g. it must decompress still and video images in real-time), and may result in degradation and compression artifacts in the restored and displayed image. While causing some image quality problems on virtually all client computing platforms, the increase in computational intensity may render the well-known technologies unsuitable for use on "lower end" computing platforms such as personal digital assistants ("PDA"), handheld PC's, and wireless application protocol ("WAP") telephones.

As such, according to this third aspect of the related invention (transmitting the center portion of the image with priority), the user's image perception is not noticeably or adversely affected due to the organization of the human eye's sensor cells, as described in more detail in the following paragraphs.

The net effect of these three aspects of the related invention is that very quickly (compared to prior methods), the center of the view area at which the viewer is looking is always displayed at the best possible resolution, where it is most important, and where the viewer's eye fovea makes best use of the increased resolution. The higher resolution also enhances the three dimensional acuity of the scene being viewed, and thus provides a substantially improved real-time remote 3D image.

The related and present inventions are preferably realized in part as software processes in conjunction with certain hardware and computer components. Common computing platforms are used within the system arrangement, and as such, we first present a generalized discussion of computing platforms which may be employed to realize the invention. These common computing platforms can include personal computers, enterprise web servers, and workstations, as well as portable computing platforms such as personal digital assistants ("PDA"), handheld PC's, web-enabled wireless telephones, and other types of personal information management ("PIM") devices.

Figure 1:
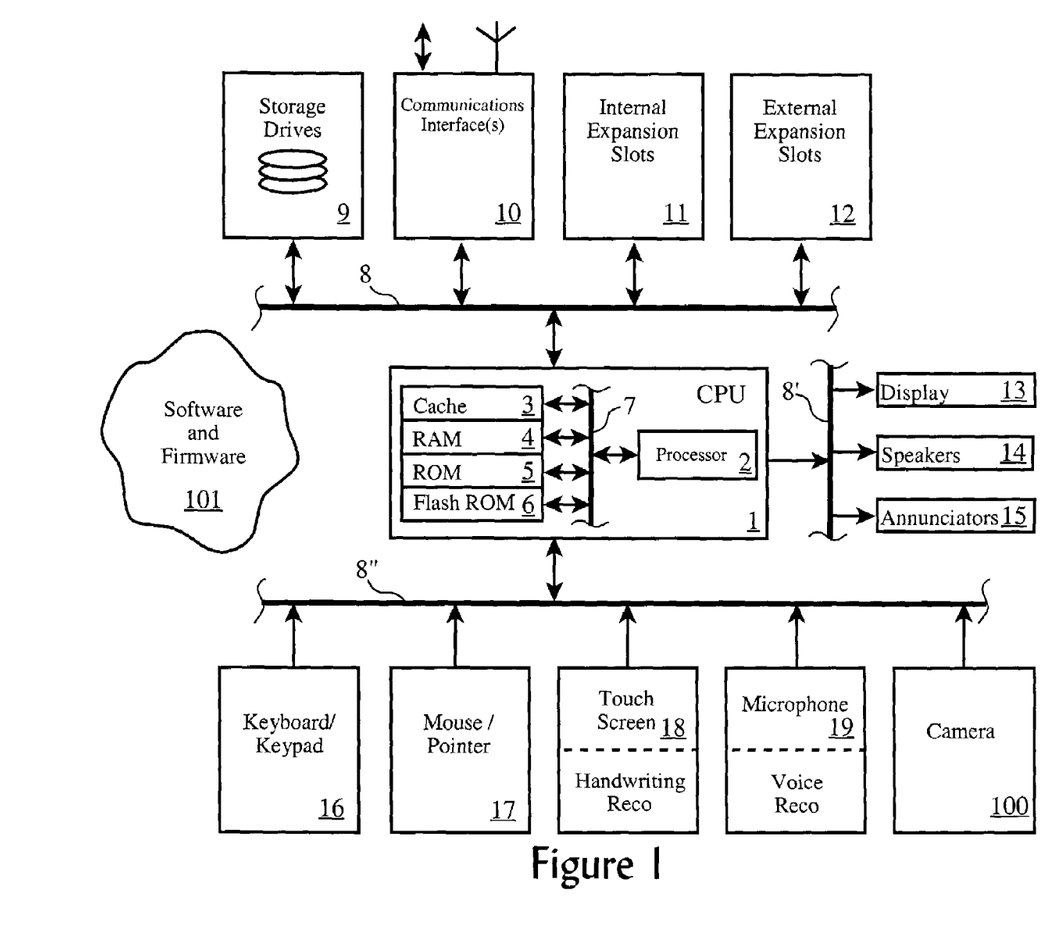
FIG. 1 depicts a generalized computing platform architecture, such as a personal computer, server computer, personal digital assistant, web-enabled wireless telephone, or other processor-based device.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip [™] and Jaz [™], Addonics SuperDisk [™], etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint [™]. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
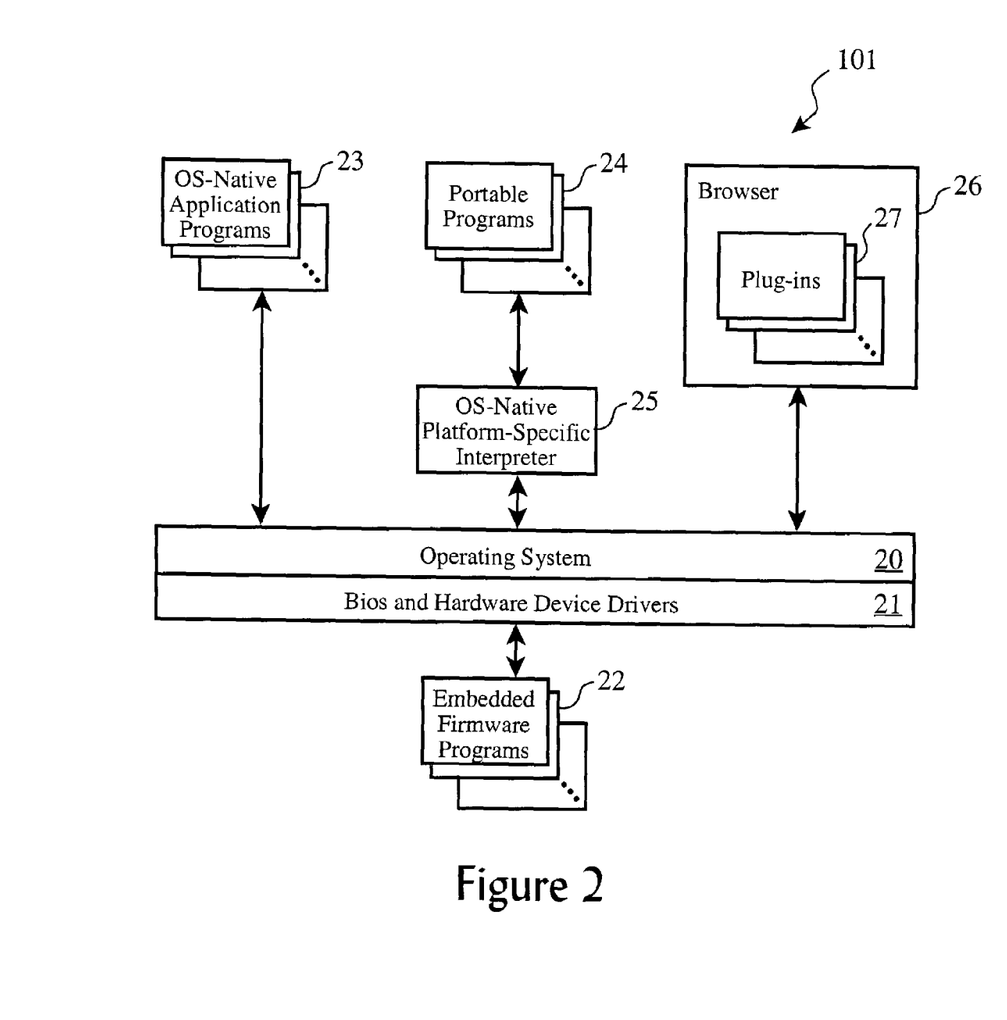
FIG. 2 shows a generalized organization of software and firmware associated with the generalized architecture of FIG. 1.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java [™] scripts and programs.

Often, computing platforms are also provided with a form of web browser or micro-browser (26), which may also include one or more extensions to the browser such as browser plug-ins (27).

The computing device is often provided with an operating system (20), such as Microsoft Windows [™], UNIX, IBM OS/2 [™], LINUX, MAC OS [™] or other platform specific operating systems. Smaller devices such as PDA's and wireless telephones may be equipped with other forms of operating systems such as real-time operating systems ("RTOS") or Palm Computing's PalmOS [™].

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs, of a wide variety of computing platforms, including but not limited to personal computers, PDAs, PIMs, web-enabled telephones, and other appliances such as WebTV [™] units.

Figure 3:
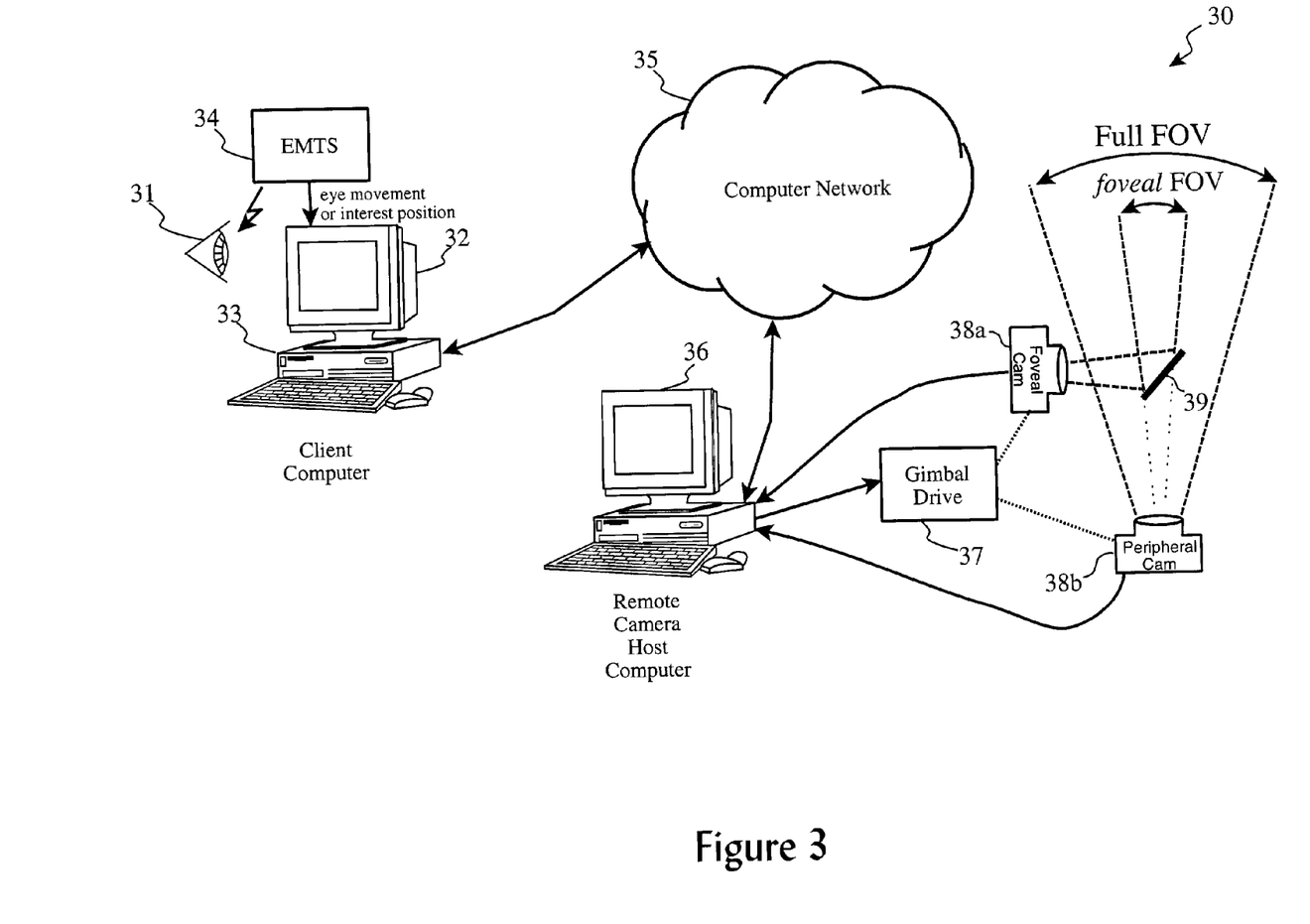
FIG. 3 illustrates the arrangement of system components according to the preferred embodiment.

Turning now to FIG. 3, the arrangement of system components according to the preferred embodiment is shown. A client computer (33) is provided with a user display (32) and with several software programs such as a web browser, operating system, and communication protocol suite. Such a computer may be an IBM NetVista [™] personal computer, running a variant of Microsoft's Windows [™], and a web browser such as Netscape's Navigator [™] program. Other computer platforms, operating systems and programs could equally well be employed without departing from the spirit and scope of the present invention.

The client computer is also preferrably provided with an eye movement tracking system ("EMTS") (34) which detects and monitors the position of the user's eye(s) (31) or determines the point of interest of the user on the display (32). Such systems are readily available, such as the Eye-Link II from SR Research of Mississauga, Ontario, Canada. The EyeLink II's sensor, which is in the form of a headset with small cameras looking at the wearer's eyes, interfaces to the client computer (33) via a Universal Serial Bus ("USB") data link or to a proprietary PC add-in card. Other EMTS systems are available which employ a variety of eye tracking technologies, and which interface to the computer in different manners. Use of an alternate EMTS system or technology according to cost, accuracy, and intended application environment may be made without departing from the spirit and scope of the present invention.

The client computer (33) is provide with data communications capabilities to a computer network (35), including but not limited to LAN cards, modems, wireless network interfaces, and Infrared Data Arrangement ("IrDA") interfaces. The computer network (35) may comprise a LAN, WAN, wireless link, intranet, Internet or other suitable data communications means.

Also interconnected to the computer network (35) is a remote camera host computer (36). The camera host server (36) may comprise one of the common computing platforms as previously described, and according to the preferred embodiment is an IBM WebSphere [™] enterprise application server (with server suite software) running Linux or Microsoft's Windows NT [™] operating system. The server (36) is also equipped with appropriate communications interfaces (LAN, WAN, modems, etc.) and software (TCP/IP, Hyper Text Transfer Protocol server, etc.). The WebSphere product provides all necessary web site hosting, HTTP communications, and maintenance functionality, as well as being extensible and customizable through the use of Java Bean and servelet technologies. It will, however, be recognized by those skilled in the art that alternate software programs, such as the Apache HTTP server, computing platforms and operating systems may be employed without departing from the spirit and scope of the present invention.

The remote camera host server (36) is provided with a control interface to a gimbal drive (37) upon which two web cams (38a, 38b) are mounted with the same center line of sight such that a first camera (38a) is focused upon the foveal field of view ("FOV"), and the second camera (38b) is focused upon the broader, full FOV. The gimbal drive (37) may be commanded by the host computer (36) to point the cameras to any position within the range of freedom of the gimbal.

According to the preferred embodiment, the foveal camera (38a) is equipped with a telephoto lens or a high resolution imaging sensor (or both), and the peripheral camera (38b) is equipped with a wider angle lens or lower resolution imaging sensor (or both).

Since the central portion of the image taken by the peripheral camera will be replaced by the higher resolution image from the foveal camera, the foveal camera in some configurations may simply be placed within the view of the peripheral camera if the foveal camera is of sufficiently small sizes. Other techniques well known in the field of optics can be employed, as well, such as use of splitting optics so that the two cameras "look through" a single point of view. As such, one of any methods known in the art of optics for splitting an image or arranging two devices along the same line of sight may be used in this arrangement, including a half-silvered mirror (39) as shown. Alternately, if the cameras are sufficiently small, they may be placed side-by-side such that their lines of sight are effectively the same line of sight, but not so far apart that stereoscopic effects can be noticed between their two images. If stereoscopic viewing is desired, then four cameras may be used—a right foveal camera, a right peripheral camera, a left foveal camera, and a left peripheral camera.

The cameras (38a, 38b) may be of several common types of camera, including a digital camera which directly interfaces to the host computer (36) via digital bus such as a USB, serial port (e.g. RS-232), FireWire, or other digital interface. Alternatively, they may be "analog" cameras with "analog" signal interfaces to an appropriate PC interface card, such as a video signal or RGB signal.

The software in the client computer (33) cooperates with the software in the host computer (36) to allow the user's eye movements to be converted to gimbal movement commands, and to collect, process and display the images from the camera(s). Both images and commands are exchange between the host (36) and client (33) via the computer network (35) using well-known protocols such as HTTP and TCP/IP. Specific processes realized in software are described in more detail in the following paragraphs.

Figure 4:
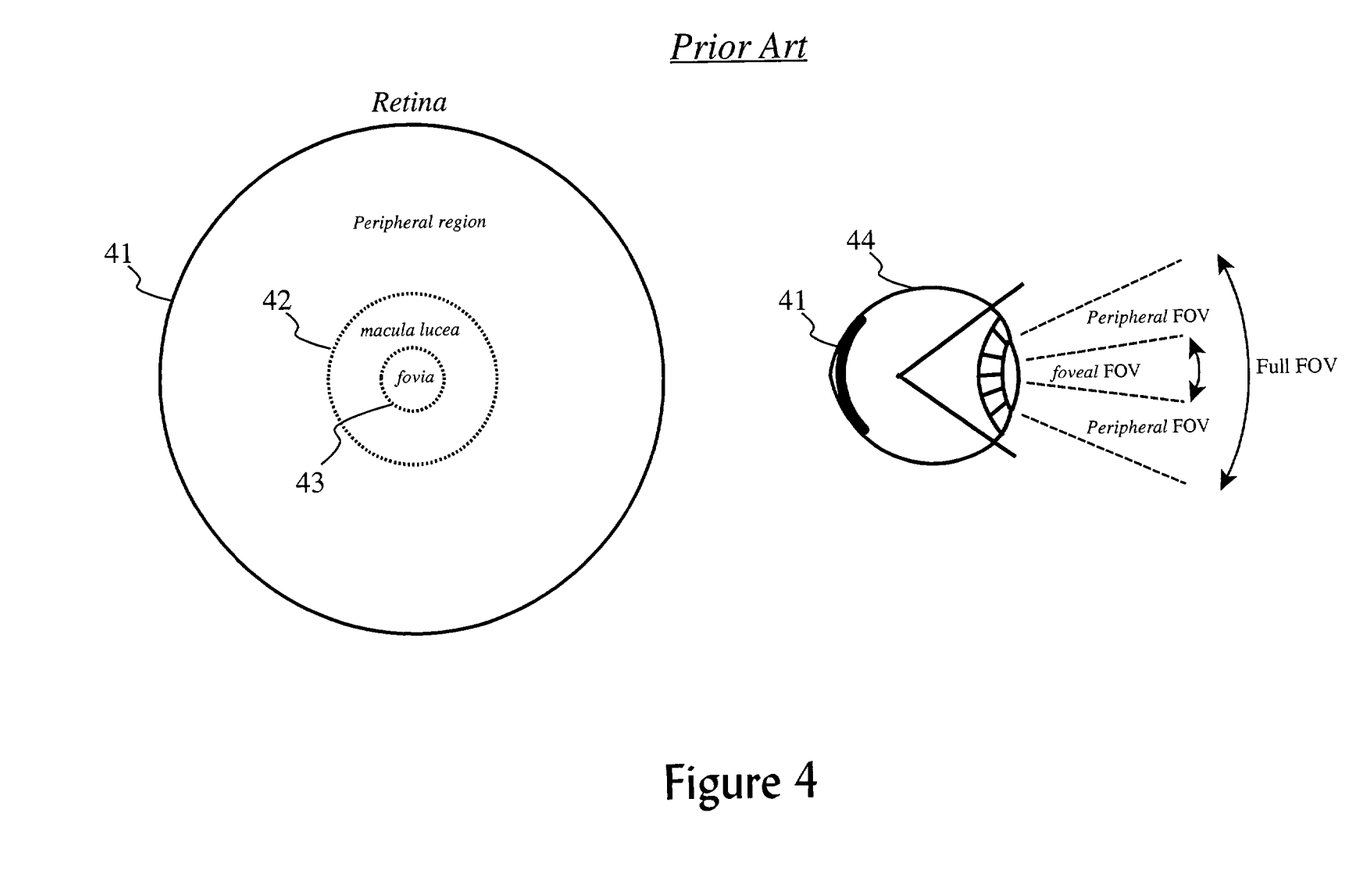
FIG. 4 provides some anatomy background of the human eye.

As the method employed by the invention to reduce the bandwidth consumed by the transmission of images takes advantage of certain physiological aspects of the human eye, we now turn our attention to FIG. 4 for a brief review of the well-known anatomy (40) of a human eye. The "imaging sensor" of the human eye (44) is the retina (41), which is located on the back inside surface of the orb of the eye. The retina (41) contains approximately 127 million light sensor cells, of which about 94% are "rods" and only 6% are "cones". Rods exhibit high light sensitivity to allow viewing in low light conditions such as night or dusk, but are relatively color insensitive. Cones are less sensitive to low-light conditions, but produce more sensation to colors within the visible light spectrum.

The rods are relatively evenly distributed across the retina, but the cones are primarily concentrated in the center region of the retina (41) called the macula lutea (42). At the center of the macula lutea (42) is a small depression called the fovea (43), which contains almost exclusively cones. This higher concentration of cones in the fovea gives rise to much greater acuity of vision (and sense of image "sharpness" or resolution) for portions of a scene which falls upon the fovea.

As such, the field of view (FOV) of the human eye can be defined as two regions: (a) a foveal field of view (FFOV), and a (b) peripheral field of view (PFOV). The FFOV is the portion of a scene which falls upon the high-acuity foveal and macula lutea regions of the retina, while the PFOV is the portion of the scene which is incident upon the remaining portion of the retina. The higher resolution FFOV comprises approximately the center 2° (degrees) of the full field of view.

As such, the human observer's interpretation of information displayed in a digital image on a computer screen is highly dependent on this anatomical arrangement. For example, in the display of a very high resolution image, the "detail" of the outer portion of the image which falls in the peripheral FOV is not collected by the eye, and thus is not used by the human intellect. Likewise, a lower resolution image display may not harm peripheral processing of the image, such as detection of movement within the image or light sensitivity to the image, but severely degrades the perception of detail in the foveal field of view and thus limits the viewer's ability to use the image intelligently (e.g. make corresponding hand movements in repairs or medical procedures).

The PFOV, however, provides a great degree of movement sensitivity, such as noticing flashing, waving, or changing portions of the PFOV. The human eye is naturally attracted to such changes in the peripheral area, and the human brain will immediately command the eye movement muscles to repoint the eyes such that the area of change or movement falls upon the greater resolution fovea for closer inspection and greater understanding. This is the fundamental reason that indicators such as flashing lights or LEDs, bright orange flags, and waving of a hand in a crowd attracts the attention of a viewer so well.

Figure 5:
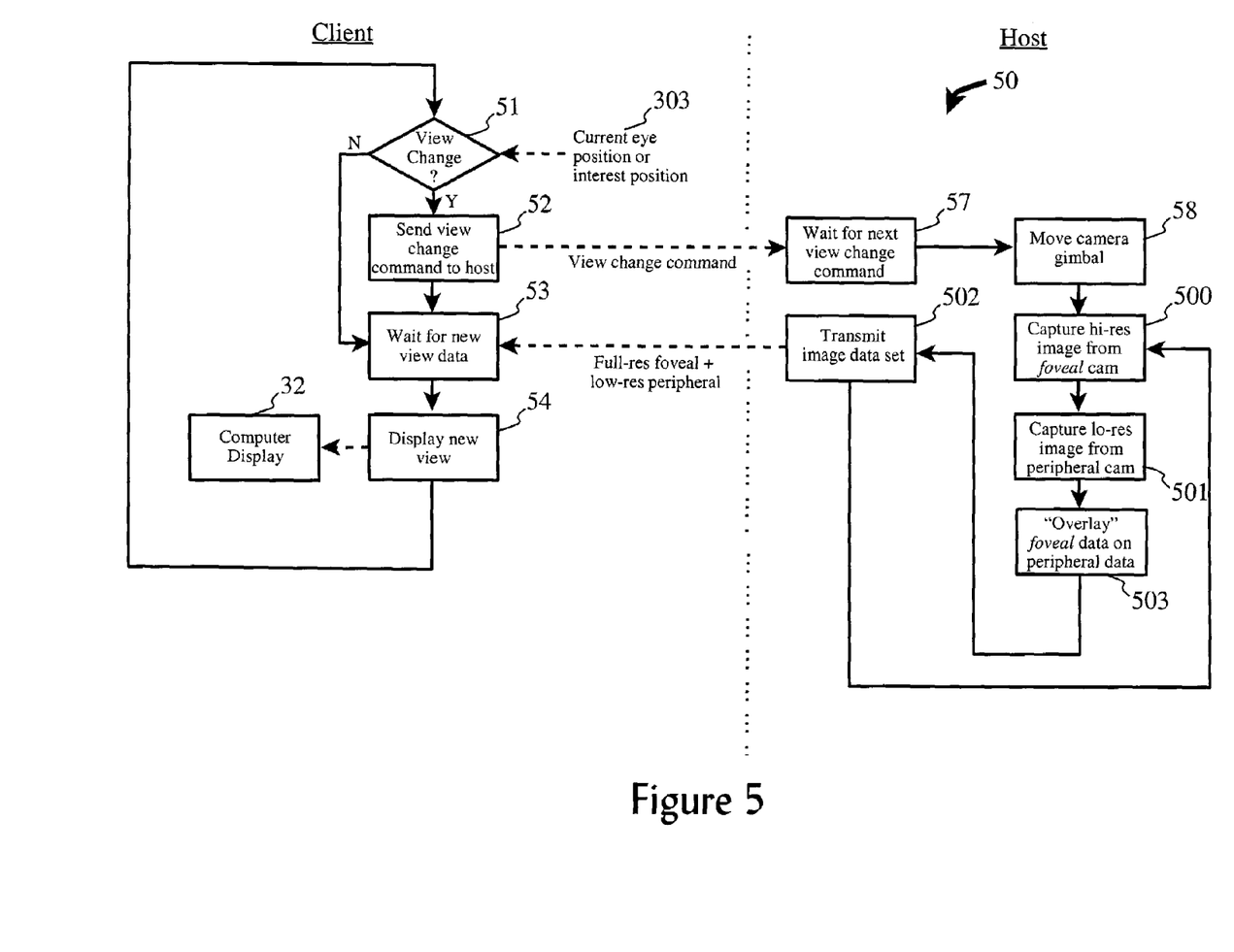
FIG. 5 illustrates the cooperative methods of the invention for client and server systems.

The method of the invention takes advantage of these anatomical "features" of the human eye and brain in order to achieve the objectives and advantages previously set forth. Turning to FIG. 5, a high-level view of the method of the invention is illustrated as partially host-implemented and partially client-implemented.

The client-side process is preferably realized as a plug-in for the Navigator [™] web browser, and the server-side process as a Java [™] servlet. However, it will be readily apparent to those skilled in the are that many alternate embodiments are available within the spirit and scope of the invention, including but not limited to implementation in silicon as an integrated circuit, software implementation as a stand along program or as enhancements integral to existing programs.

The client process periodically determines (51) if there has been a change in the viewer's eye position or point of interest on the computer display (32), as provided by the eye movement tracking system (34). If there has been a change in eye position or point of interest, a view change command is generated and transmitted (52) to the remote camera host computer via the computer network, as previously described. For example, if the EMTS indicates that the user's eyes have moved upwards 2° (e.g. the FFOV has completely changed), a command to move the gimbal upwards 2° is sent to the remote camera host computer.

Upon receipt (57) of this gimbal command change, the host implements the appropriate control signal changes to move (58) the camera(s) (38a, 38b) in the appropriate direction by the appropriate amount. Then, a new high resolution frame of digital image is captured (500) from the foveal camera, and a low resolution image is captured (501) from the peripheral camera. The image data of the foveal FOV is then "overlaid" on the image data of the peripheral view by inserting it into the data set of the peripheral field of view image or otherwise associating it with the peripheral field of view image data set. This avoids the need to compress full resolution image data in order to generate a low resolution peripheral view data set.

According to the preferred embodiment, a good match to the human eye is obtained when the peripheral area level of detail is 50% to 85% less than the level of detail of the foveal area, which roughly matches the detail sensation in the peripheral and foveal areas of the retina, and which will not cause a perceptible or noticeable degradation in overall image quality.

For example, let's assume the average viewer's full FOV is 60°, of which 2° is the foveal FOV or high-resolution FOV. This amounts to only the center 3.33% of the entire image in either axis, or just 0.1% of the total area of the image. Let's also assume that, as studies indicate, the peripheral acuity of the average viewer is only 15% to 50% of that of the foveal acuity. This implies that 99.9% of the image data which lies in the peripheral view of the viewer can be reduced in resolution by at least 50%, meaning that the overall amount of data for the image can also be reduce by 50% (or more) without causing noticeable reduction in visual clarity. This, however, is predicated by the ability to know where the viewer is viewing in the image such that the foveal area can be determined.

This may result in a 50% or more reduction in the size of the image data to be transmitted (502) from the server to the client, and a halving (or better) of the latency of the image update from the server to the client.

Returning to our discussion of FIG. 5, the image data set having full resolution data in the foveal area and reduced resolution data in the peripheral are is transmitted (502) to the waiting (53) client, which then displays (54) the image to the viewer on the computer display (32). The change in viewing perspective or angle of the cameras should now match the new position of the viewer's eyes.

In the case of full-motion video transmission from the cameras to the client, the server process may simply return to capture (500) and process (501, 503) the next frame of video from the cameras, sending (502) those to the client for display. In this arrangement, the change of gimbal position becomes "event driven" by the receipt of a new position command from the client, which causes the cameras to be repositioned prior to the capturing and processing of the next frame of image data.

According to an alternate embodiment, the two cameras (38a, 38b) are replaced with a single camera which is outfitted with an adjustable lens having a telephoto and a wide angle setting under the control of the server. Then, when the higher resolution image is to be captured (500), the server commands the lens to a telephoto setting. Likewise, when the lower resolution peripheral view image is to be captured, the server commands the lens to a wide angle setting.

By utilizing the system arrangement and methods of the invention described herein, transmission bandwidth requirements and image update latency for remote camera viewing may be reduced by over 50% without noticeable image degradation or image processing artifacts.

While details of a preferred embodiment have been disclosed accompanied by illustrative examples, it will be recognized by those skilled in the art that certain alternate embodiments may be realized without departing from the spirit and scope of the invention, including but not limited to adoption of alternate peripheral section compression and reduction methods, use of alternate computing platforms and programming methodologies, incorporation of other eye movement tracking technologies or systems, and use of other computer networks and imaging devices. Therefore, the scope of the present invention should be determined by the following claims.

What is claimed is:

1. A method for generating an image for user viewing wherein images have a field of view angles formed between two lines intersecting at a point of view and traversing two edges of view area in a direction of view of the image, the method comprising the steps of:
   determining a point of interest of a user within a full field of view in a first electronic image;
   capturing a full resolution circular foveal image within said full field of view, said foveal image having a field of view being centered upon said point of interest and having a field of view angle between 1° and 4°;
   capturing a peripheral image within said full field of view having a reduced resolution, being centered upon same said point of interest, and having a field of view angle greater than said foveal field of view angle and less than or equal to said full field of view angle;
   transmitting said foveal image and said peripheral image to a remote display device;
   overlaying by said remote display device said foveal image onto said peripheral image both of which being centered upon same said point of interest such that a combined image having a full resolution foveal area and a surrounding reduced resolution peripheral area is rendered;
   displaying said combined image to a user;
   capturing a full resolution peripheral image having said peripheral field of view angle and being centered upon same said user point of interest;
   subsequent to transmission of said reduced resolution peripheral image transmitting said full resolution peripheral image to said remote display; and
   replacing said reduced resolution image in said combined image with said received full resolution peripheral image area surrounding said full resolution foveal image area.

2. The method as set forth in claim 1 wherein said step of capturing a full resolution foveal field of view image comprises using a first camera having a telephoto lens, and wherein said step of capturing a full field of view image with a reduced resolution comprises using a second camera having a wide angle lens.

3. The method as set forth in claim 1 wherein said step of capturing a full resolution foveal field of view image comprises setting a camera lens to a telephoto setting, and wherein said step of capturing a full field of view image with a reduced resolution comprises setting a camera lens to a wide angle setting.

4. The method as set forth in claim 1 wherein said step of providing said combined image for display to a user comprises transmitting a digital image over a computer network.

5. A computer readable medium encoded with software for generating an image for user viewing, wherein images have field of view angles formed between two lines intersecting at a point of view and traversing two edges of view area in a direction of view of the image, the software performing the steps of:
   determining a point of interest of a user within a full field of view in a first electronic image;
   capturing a full resolution circular foveal image within said full field of view, said foveal image having a field of view being centered upon said point of interest and having a field of view angle between 1° and 4°;
   capturing a peripheral image within said full field of view having a reduced resolution, being centered upon same said point of interest, and having a field of view angle greater than said foveal field of view angle and less than or equal to said full field of view angle;
   transmitting said foveal image and said peripheral image to a remote display device;
   overlaying by said remote display device said foveal image onto said peripheral image both of which being centered upon same said point of interest such that a combined image having a full resolution foveal area and a surrounding reduced resolution peripheral area is rendered;
   displaying said combined image to a user;
   capturing a full resolution peripheral image having said peripheral field of view angle and being centered upon same said user point of interest;
   subsequent to transmission of said reduced resolution peripheral image, transmitting said full resolution peripheral image to said remote display; and
   replacing said reduced resolution image in said combined image with said received full resolution peripheral image area surrounding said full resolution foveal image area.

6. The computer readable medium as set forth in claim 5 wherein said software for capturing a full resolution foveal field of view image comprises software for receiving an image from a first camera having a telephoto lens, and wherein said software for capturing a full field of view image with a reduced resolution comprises software for receiving an image from a second camera having a wide angle lens.

7. The computer readable medium as set forth in claim 5 wherein said software for capturing a full resolution foveal field of view image comprises software for setting a camera lens to a telephoto setting, and wherein said software for capturing a full field of view image with a reduced resolution comprises software for setting a camera lens to a wide angle setting.

8. The computer readable medium as set forth in claim 5 wherein said software for providing said combined image for display to a user comprises software for transmitting a digital image over a computer network.

9. A system for rendering an image wherein images have a field of view angles formed between two lines intersecting at a point of view and traversing two edges of view area in a direction of view of the image, the system comprising:

a user point of interest tracking system which determines a user point of interest within an electronic image having a full field of view;

a full resolution image capturing means for capturing a circular foveal image centered upon said user point of interest, said foveal image having a field of view being centered upon said point of interest and having a field of view angle between 1° and 4°, and further configured to capture a full resolution peripheral image having said peripheral field of view angle and being centered upon same said user point of interest;

a reduced resolution image capturing means for capturing a peripheral image centered upon same said user point of interest, said peripheral field of view measurement being greater than said foveal field of view angle and less than or equal to said full field of view angle;

a transmitter configured to transmit said foveal image and said peripheral image to a remote display device, and further configured to transmit said full resolution peripheral image to said remote display subsequent to transmission of said reduced resolution peripheral image;

a combined image renderer configured to receive said foveal image and said peripheral image, and to overlay said full resolution foveal image onto said peripheral image both of which being centered upon same said point of interest thereby creating a combined image having full resolution in a foveal area and reduced resolution in a peripheral area, and further configured to replace said reduced resolution image in said combined image with said received full resolution peripheral image area surrounding said full resolution foveal image area; and a remote display device configured to display said combined image to a user.

10. The system as set forth in claim 9 wherein said comprises an eye movement tracking system.

11. The system as set forth in claim 9 wherein said full resolution image capturing means comprises a first camera equipped with a telephoto lens, and wherein said reduced resolution image capturing means comprises a second camera equipped with a wide angle lens.

12. The system as set forth in claim 9 wherein said full resolution image capturing means and said reduced resolution image capturing means comprise a camera equipped with an adjustable lens having a telephoto and a wide angle setting.

13. The system as set forth in claim 9 wherein said means for displaying said combined image to a user comprises a web browser system.

* * * * *